United States Patent [19]

Patrick

[11] Patent Number: 4,526,500
[45] Date of Patent: Jul. 2, 1985

[54] PROTECTIVE MEMBER FOR METAL COILS

[76] Inventor: Clayton D. Patrick, 1608 E. John St., Knox, Ind. 46534

[21] Appl. No.: 453,347

[22] Filed: Dec. 27, 1982

[51] Int. Cl.³ .............................................. B60P 7/12
[52] U.S. Cl. ...................................... 410/48; 410/47; 410/99
[58] Field of Search ............. 24/68 CT, 69 T, 115 G, 24/115 H, 115 J; 59/93; 410/34, 35, 36, 37, 38, 39, 40, 41, 47, 48, 49, 50, 51, 96, 97, 98, 99, 100, 101, 102, 103, 105, 155, 156, 31, 32, 42, 43

[56] References Cited

U.S. PATENT DOCUMENTS

| | | | |
|---|---|---|---|
| 1,542,362 | 6/1925 | Blakely | 410/47 |
| 2,622,918 | 12/1952 | Staffe | 410/50 X |
| 2,772,064 | 11/1956 | Cole | 410/99 X |
| 3,073,439 | 1/1963 | Symmonds, Jr. | 410/41 X |
| 3,104,085 | 9/1963 | Skladany | 410/49 |
| 3,147,176 | 9/1964 | Haslam | 293/1 X |
| 3,152,693 | 10/1964 | Anderson | 410/99 X |
| 3,154,026 | 10/1964 | Klasing, Jr. | 410/41 |
| 3,209,706 | 10/1965 | Broling | 410/47 |
| 3,875,617 | 4/1975 | Cline | 410/47 |

Primary Examiner—Randolph A. Reese
Assistant Examiner—Mark J. Abate
Attorney, Agent, or Firm—Eugene C. Knoblock

[57] ABSTRACT

A protective member for use in securing metal coils to a transport vehicle or other support. The member is formed of hard, wear-resistant material having a coil contacting surface and an opposed surface. The opposed surface is grooved to receive a cable, chain or other securement member which spans the coil and whose ends are secured to the vehicle or other support. A plurality of magnetic strips are secured to the coil engaging surface of the block for positioning the block on a metal coil. Releasable chain or cable retaining means are carried by the member transversely of said groove.

6 Claims, 7 Drawing Figures

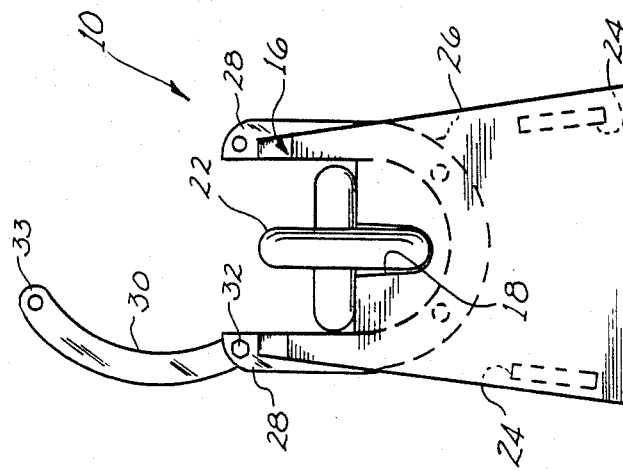
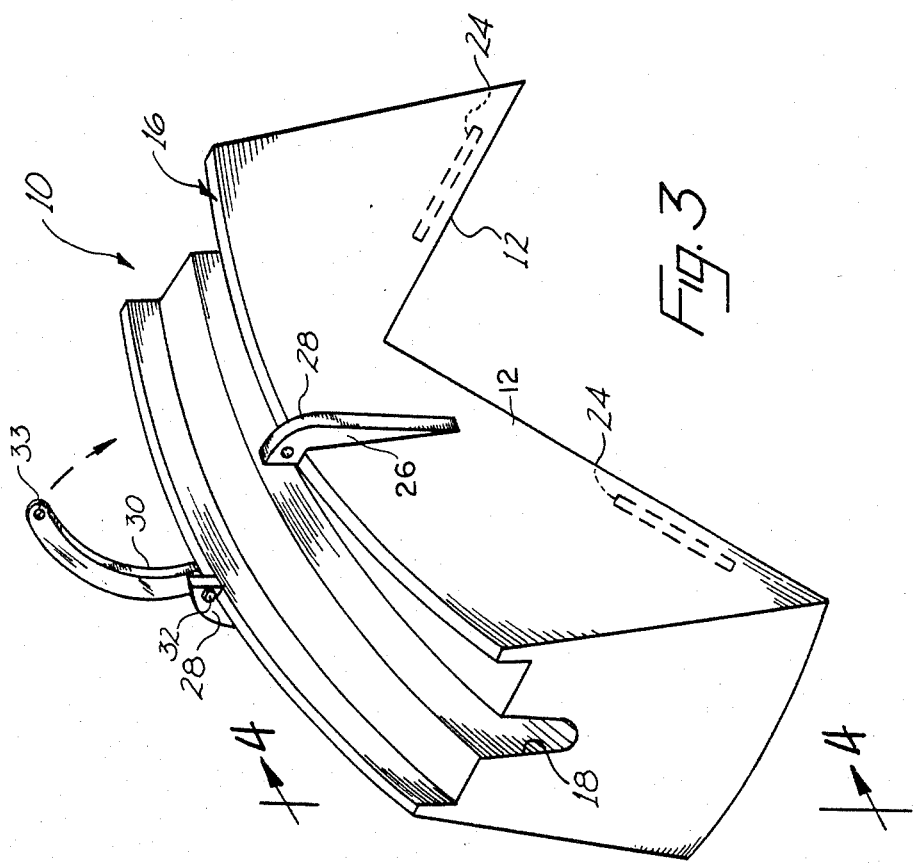

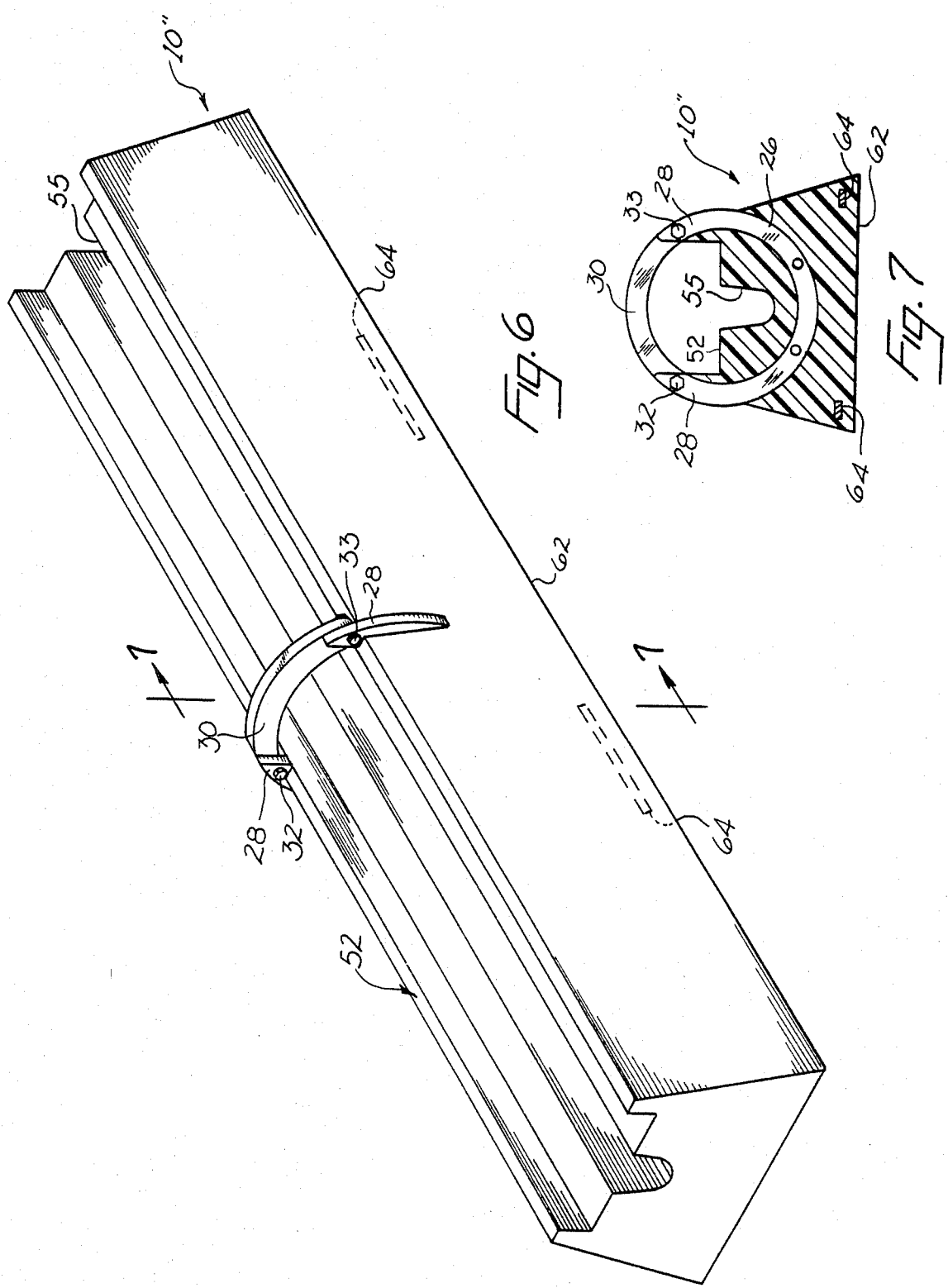

PROTECTIVE MEMBER FOR METAL COILS

BACKGROUND OF THE INVENTION

This invention relates to a protective member for metal coils.

In the transportation of heavy metal coils, such as steel coils weighing between 10,000–64,000 lbs. and of a diameter in the order of sixty inches or less, it is necessary to utilize cables or chains to position the coil upon the truck or other transport vehicle. The conditions of transport often entail substantial vibration. Adequate anchorage of the coil requires tight contact between the coil and the chains or cables used to anchor the coil to the supporting base. The combination of heavy vibration and tight contact between the chains or cables and the coil frequently causes damage to the coil, such as bending or severing of coil parts contacted by the chain. Efforts have been undertaken to minimize such damage by using wooden blocks, cardboard, and other items positioned between the coil and the chain. These efforts have not been satisfactory because such protective members often shift relative to the coil and the cable or chain, or are broken during transit, thereby enabling direct contact of the chain with the coil and damage to the coil.

SUMMARY OF THE INVENTION

The present invention seeks to eliminate coil damage caused by the retaining chain or cable during transportation of metal coils. The invention includes a block or member of hard material, such as polyurethane, having a coil contacting surface and an opposed grooved cable or chain contacting surface. Small strips of magnetic material are embedded within the inner surface of the block which hold the block in its place in preparation for securement of the chains. Embedded within the block, or otherwise carried by the block, and extending transversely of and spaced from the chain receiving groove, is a member whose ends project from the grooved surface of the block at opposite sides of the groove, and to which at one end is pivoted a retainer member which is adapted to be bolted to the opposite projecting end of the embedded member for retaining a chain or cable within the groove of the block.

Accordingly, it is an object of this invention to provide a novel and useful protective member for metal coils.

Another object is to provide a coil protective member which prevents damage to the metal coil anchored thereby.

Another object is to provide a coil protective member which is quickly and easily installed.

Yet another object is to provide a coil protective member which is resistant to damage during transport of metal coils.

Other objects of this invention will become apparent upon a reading of the following description.

BRIEF DESCRIPTION OF THE DRAWINGS

FIG. 3 is a perspective view of the first embodiment of the coil protective member.

FIG. 4 is an end view of the embodiment shown in FIG. 3.

FIG. 6 is a perspective view of a third embodiment of the invention.

FIG. 7 is a sectional view taken along line 7—7 of FIG. 6.

DESCRIPTION OF THE PREFERRED EMBODIMENTS

The preferred embodiments illustrated are not intended to be exhaustive or to limit the invention to the precise forms disclosed. They are chosen and described to explain the principles of the invention and its practical use, to thereby enable others skilled in the art to utilize the invention.

Figure 2:
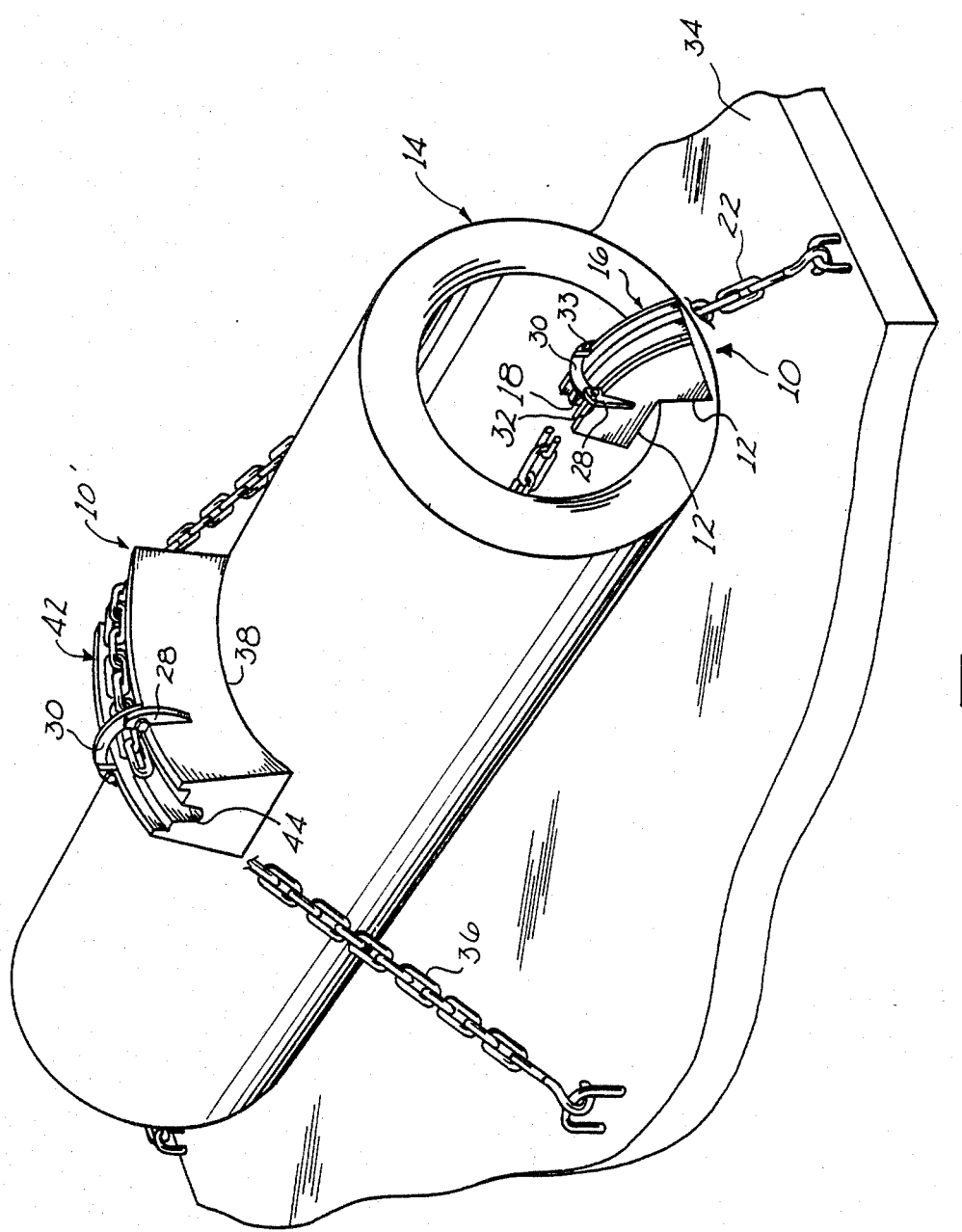
FIG. 2 is a second perspective view of a coil retained upon a base showing the position of another embodiment of the coil protective member.

One embodiment of the protective member 10 is shown in FIGS. 2–4. The member 10 is preferably formed of a hard polyurethane, or similar plastic material and has angularly displaced coil engaging surfaces 12. Surfaces 12 are preferably displaced 90° to contact the end of a coil 14 and the inner surface of a coil when placed in their intended position as shown in FIG. 2. Member 10 is curved longitudinally at its outer surface 16. A laterally stepped longitudinal groove 18 is formed in outer surface 16 for receiving a chain or cable 22 when member 10 is placed between the chain and coil 14. Small strips 24 of magnetic material are preferably embedded within member 10 adjacent surfaces 12 for holding the member in place at the end of coil 14 while chain or cable 22 is being applied to the coil and drawn taut. Also embedded within, or otherwise carried by, member 10 and extending transversely to groove 18 is a transverse member 26 whose ends 28 project from arcuate outer surface 16 at opposite sides of groove 18. A retainer member 30 has one of its ends pivoted at 32 to one projecting end 28 of transverse member 26 and the other end 33 of retainer 30 is adapted to be bolted, or otherwise fastened, to the other projecting end 28 of transverse member 26. The pivoted retainer 30 insures that chain or cable 22 is positioned within groove 18 of each anchor 10 during initial application of the chain and anchorage of the ends of the cable or chain to the base 34 on which coil 14 is supported and tensioning of the chain or cable. Base 34 may form the bed of a truck or similar transport vehicle.

In the usual practice, a tensioned chain or cable 22 is employed to anchor each coil 14, with the chain or cable being anchored at its ends to the base 34, and the central portion of the cable or chain passing within the coil. Thus, two members 10 are required for anchorage of a coil 14, with a member 10 placed at each end of the coil to accommodate the entry positions of chain or cable 22 into the coil.

Figure 1:
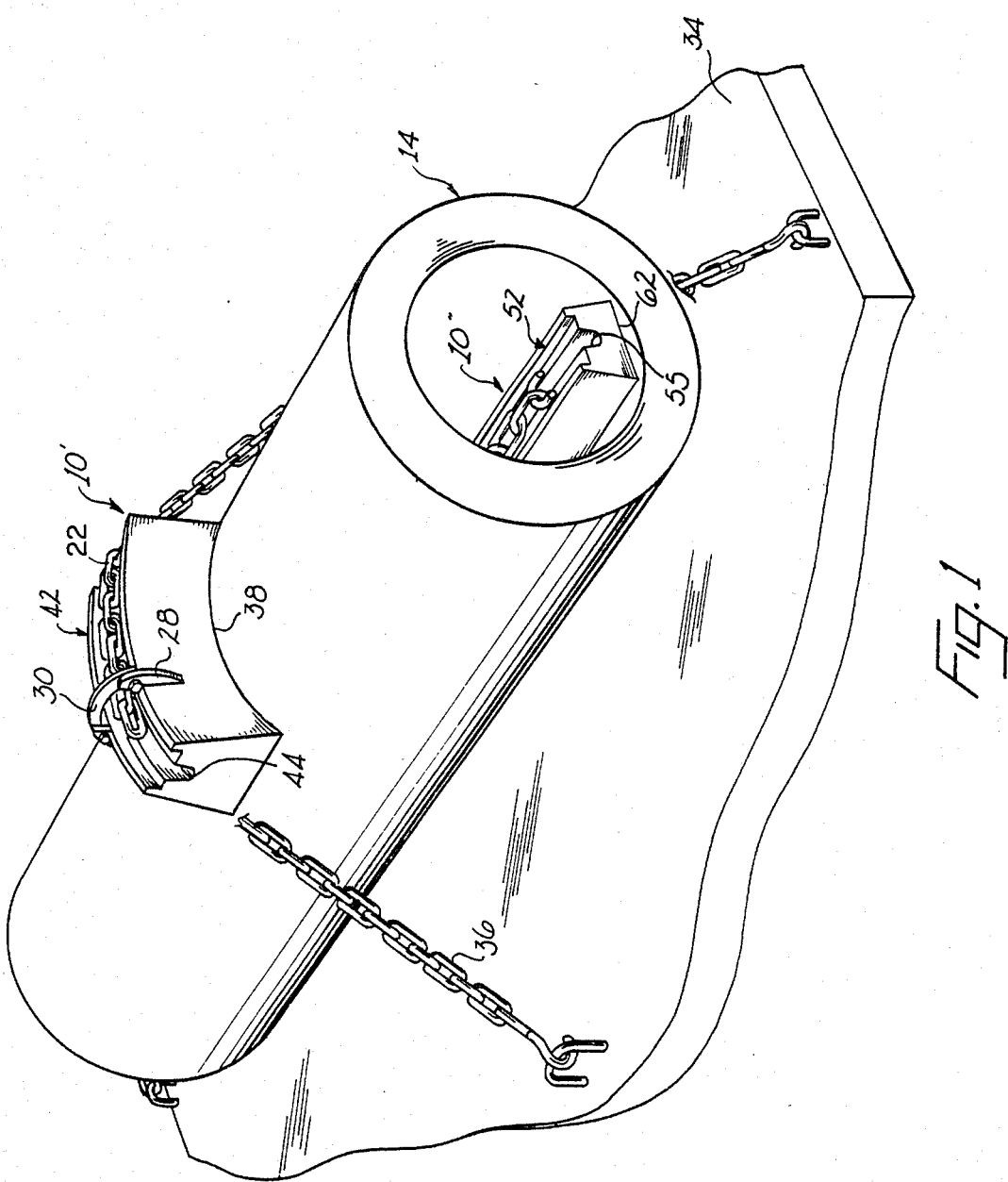
FIG. 1 is a perspective view of a coil retained upon a base showing the position of two embodiments of the coil protective member.
Figure 5:
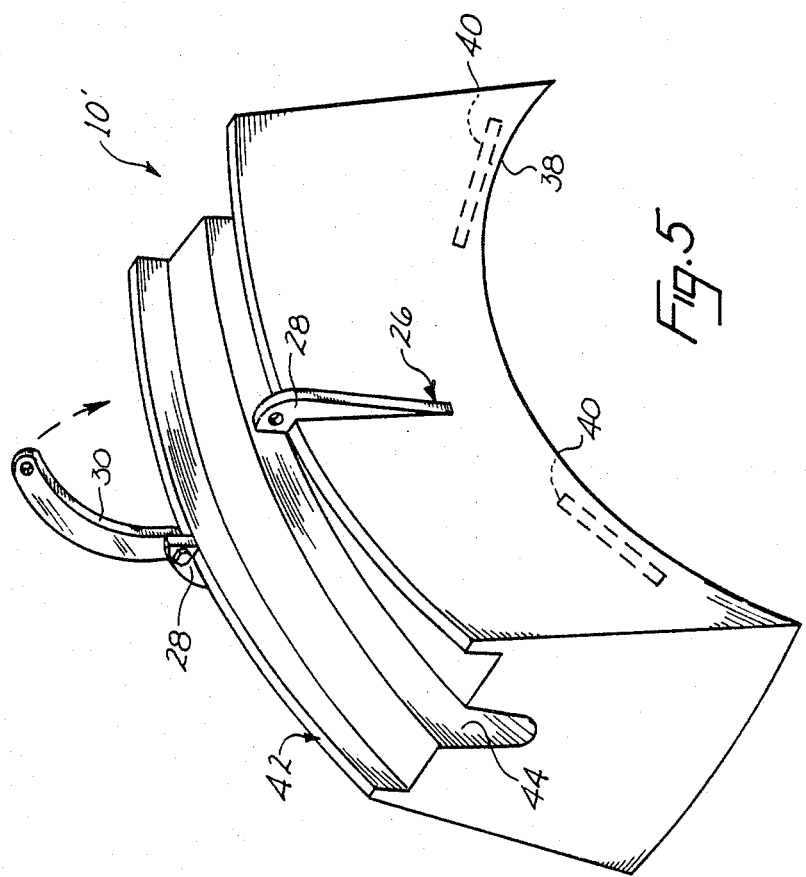
FIG. 5 is a perspective view of a second embodiment of the invention.

A second embodiment 10' of the protective member is shown in FIGS. 1, 2, and 5 which is often used in conjunction with the member 10 described above, and a second transversely extending cable or chain 36 assists in the securement of a coil 14 to a base 34. Member 10' is preferably formed of a hard polyurethane, or similar plastic material, and has a concave inner surface 38 substantially conforming to the curvature of the outer diameter of the coil to be secured. Magnetic pieces 40 are embedded within, or otherwise carried by, member 10' adjacent to inner surface 38 for holding the member 10' in place during application of cable or chain 36. Member 10' also has a convex outer longitudinal surface 42 which is longitudinally grooved at 44 to receive cable or chain 36. A member 26 is also embedded within, or otherwise carried by, member 10' transverse to groove 44 and has ends 28 protruding from outer surface 42 at opposite sides of the groove. A retainer member 30 is hinged to one of the ends 28 of transverse member 26 and is adapted to be bolted, or similarly fastened, to the other projecting end 28 of transverse member 26. The retainer member 30 is secured to member 26 to insure chain or cable placement and retention during initial application of the cable or chain 36 and during tightening and anchorage of the ends of the chain to base 34, as described above for the first embodiment of the protective member.

A third embodiment 10" of the protective member is shown in FIGS. 1, 6 and 7. This embodiment may be used in place of the member 10, as shown in FIG. 1. Member 10" is of a length approximately as long as coil 14 and is preferably formed of polyurethane, or similar hard plastic and has an outer or upper surface 52 with a longitudinal groove 55 for receiving a cable or chain 22. Member 10" has a member 26 embedded therein, or carried in similar fashion, transverse to groove 55 with its ends 28 projecting from member outer surface 52 on opposite sides of the groove. A retainer member 30 is pivoted at one end 32 to one projecting end 28 of transverse member 26 and is adapted to be bolted, or similarly fastened, at its other end 33 to the opposite projecting end 28 of member 26 for insuring chain or cable placement during initial application of cable or chain 22. The inner or lower surface 62 of member 10" is adapted to bear on the interior of a coil 14 and along its length, as shown in FIG. 1. Magnetic pieces 64 are embedded in, or otherwise attached to, member 10" adjacent inner surface 62 to hold the member in place during application of chain or cable 22.

In the usual application of protective member 10", the member is placed within the interior of coil 14 and a cable or chain 22 is passed through the coil, lying in the groove 55 and is anchored and tensioned to secure the coil to a base 34.

It is to be understood that the invention is not to be limited by the terms of the above description but may be modified within the scope of the appended claims.

What I claim is:

1. A protective device for use in securing a metal coil to a base by means of a flexible elongated securement member, comprising a hard plastic member having a coil contacting surface and an opposed grooved surface which receives said securement member, said securement member being connected at its ends to said base and extending through said groove, and a releasable retainer carried by said protective member for retaining said securement member in said groove.

2. A protective member as defined in claim 1, and magnetic means carried by said protective member adjacent to said coil contacting surface for positioning said member relative to said coil in preparation for application of said securement member.

3. The protective of claim 2, wherein said retainer includes a part anchored to said protective member transverse to said groove and having end portions protruding from said grooved surface on opposite sides of the groove, a second part spanning said groove and pivoted at one end to one of said protruding ends of said anchored part, and means releasably securing the other end of said pivoted retainer part to the other protruding end of said anchored part to retain said securement member within said groove during initial application and tightening of the securement member and anchorage of the ends of the securement member to said base.

4. The protective member of claim 3 wherein the coil contacting surface of said protective plastic member is longitudinally concavely arcuate and substantially conforms to the curvature of the outer surface of said coil when said anchor member is positioned transversely upon said coil.

5. The protective member of claim 3 wherein said coil contacting surface includes opposite end portions displaced at substantially a right angle, one said end surface portion contacting the interior of said coil and the other said surface portion contacting the end of said coil, said grooved surface being longitudinally convexly arcuate and receiving said securement member.

6. The protective member of claim 3 wherein said protective member is elongated and extends substantially the length of said coil at the lower inner portion of the coil.

* * * * *